Nov. 13, 1951   R. E. SELTZER   2,574,666
COTTON CHOPPER
Filed Jan. 3, 1949   3 Sheets-Sheet 1
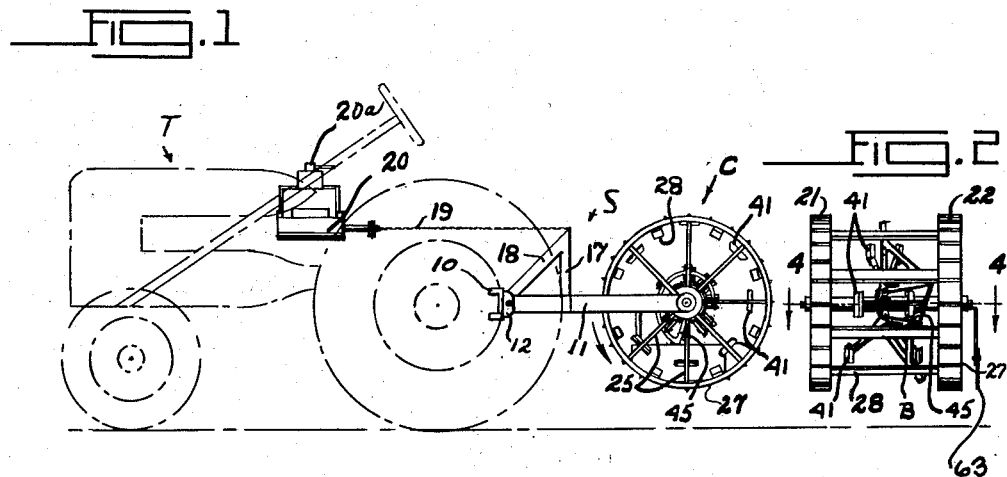
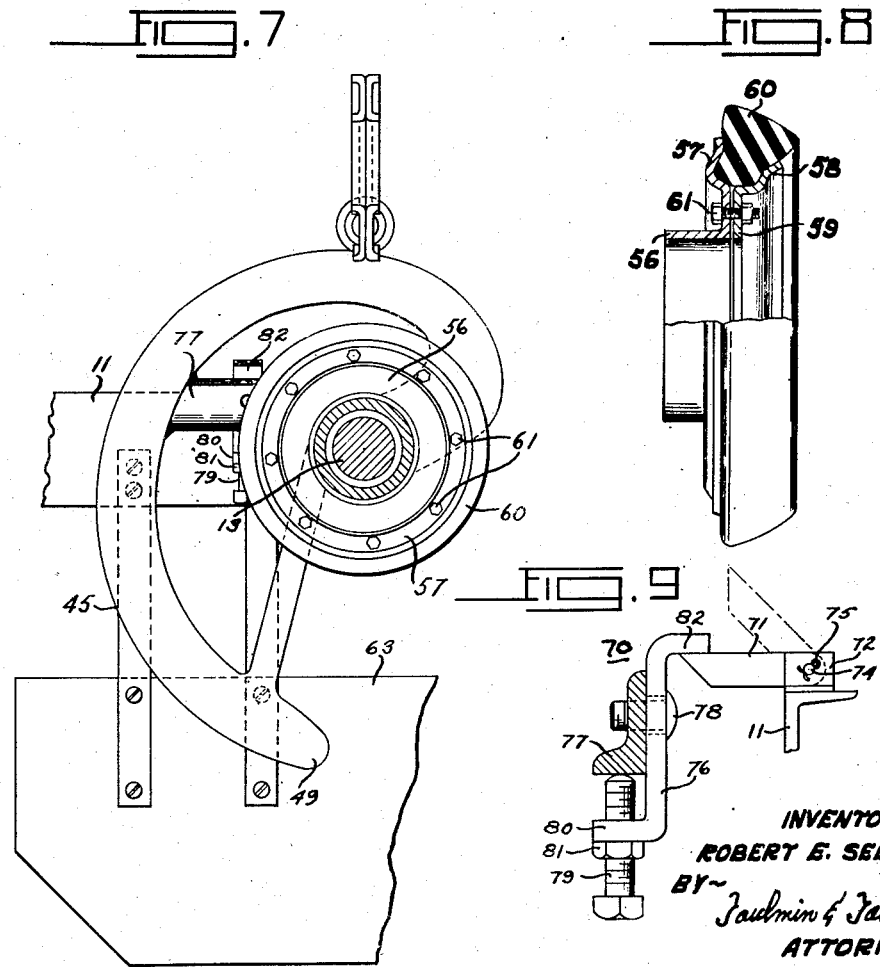
INVENTOR
ROBERT E. SELTZER
BY
Faulmin & Faulmin
ATTORNEYS Nov. 13, 1951     R. E. SELTZER     2,574,666
COTTON CHOPPER
Filed Jan. 3, 1949     3 Sheets-Sheet 2
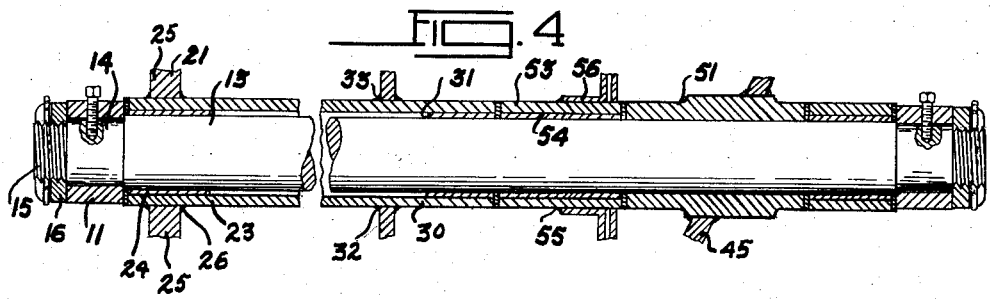
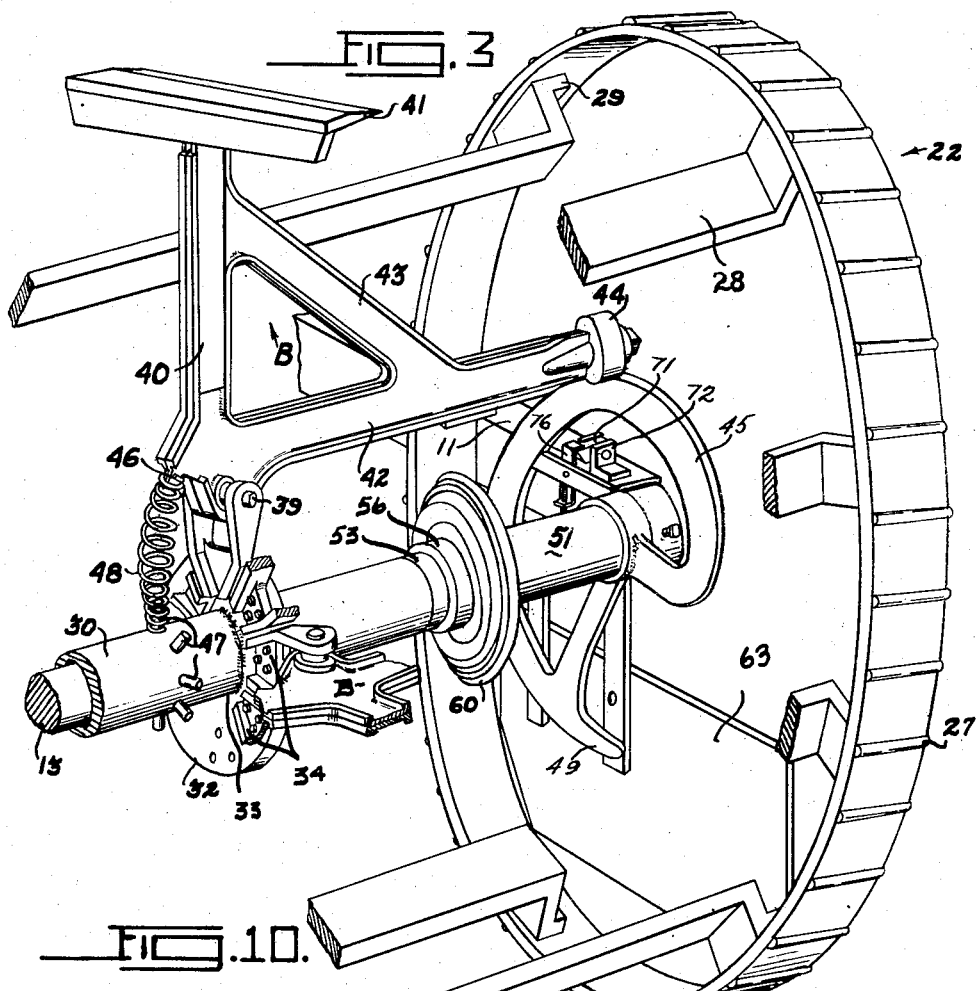
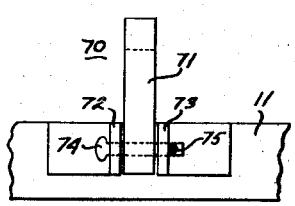
INVENTOR
ROBERT E. SELTZER
BY
ATTORNEYS Nov. 13, 1951     R. E. SELTZER     2,574,666
COTTON CHOPPER
Filed Jan. 3, 1949     3 Sheets-Sheet 3
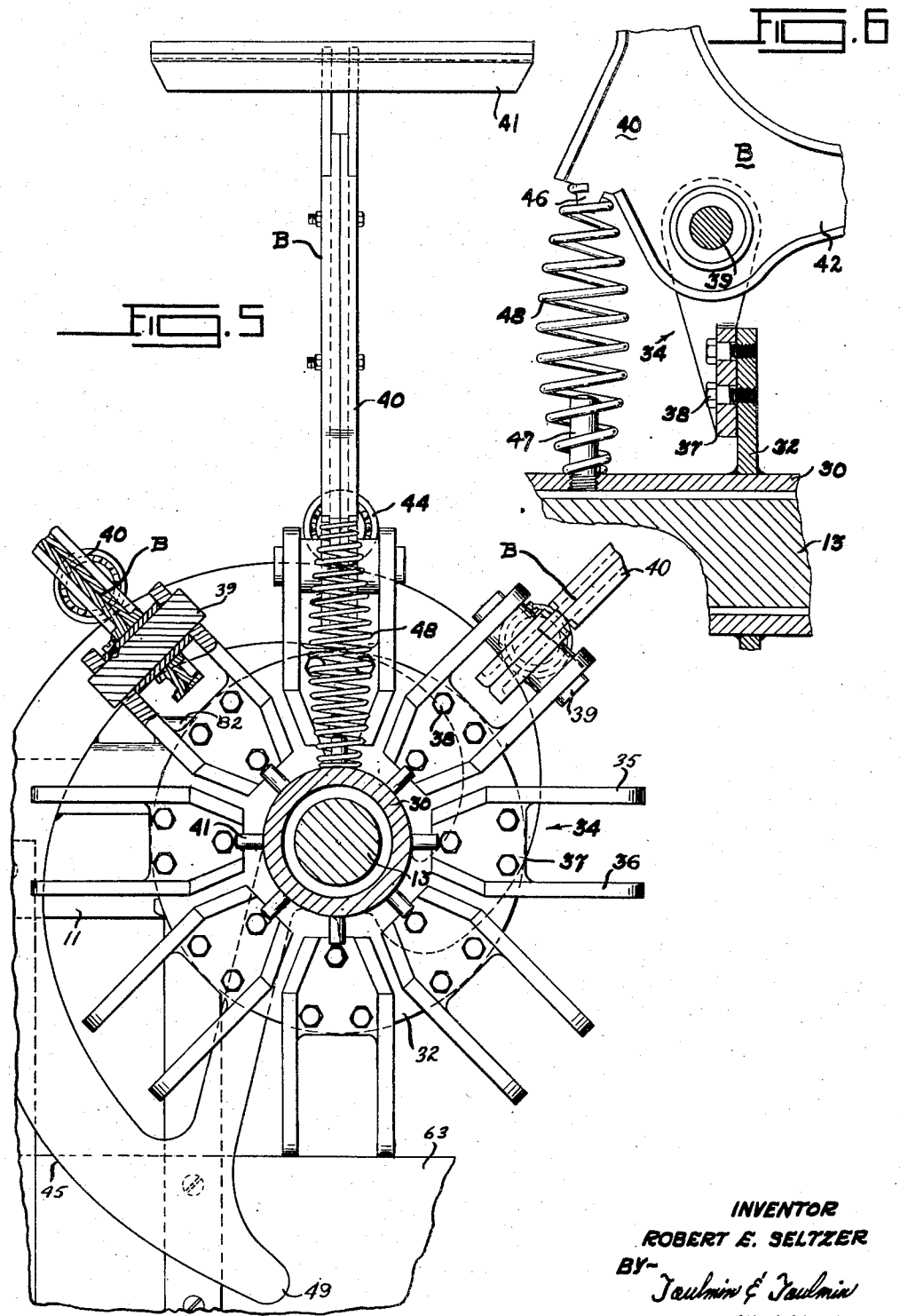
INVENTOR
ROBERT E. SELTZER
BY-
Taulmin & Taulmin
ATTORNEYS Patented Nov. 13, 1951

2,574,666

UNITED STATES PATENT OFFICE 2,574,666

COTTON CHOPPER

Robert E. Seltzer, Bellevue, Ohio, assignor to The American Baler Co., Bellevue, Ohio, a corporation of Ohio Application January 3, 1949, Serial No. 68,954

13 Claims. (Cl. 97—22)

1

The present invention relates to chopping or cutting machines of the type employed in the harvesting of cotton, and is concerned primarily with improvements in the cutting mechanism.

At the present time the practice of harvesting cotton by mounting a cutting or chopping machine on a tractor and driving this tractor over the field of growing cotton is becoming more and more widespread.

Such a cutting attachment generally includes the supporting structure by which it is mounted on the tractor, a pair of spaced wheels that are rotatably mounted on the supporting structure and which engage the ground or foliage whereby rotative movement is imparted thereto and the cutting elements are operated by this rotative movement.

An important object of the present invention is the provision of a new and improved arrangement for mounting the cutting elements on the attachment and for causing their chopping action.

More in detail the invention has as an object the provision, in an attachment of the type indicated, of a hub which rotates with the wheels at each side. Pivotally mounted on this hub are a plurality of bell cranks which are angularly spaced apart about the hub. Each of these bell cranks has a radially extending arm and another arm substantially normal thereto.

A chopping or cutting blade is mounted at the free end of each radial arm, while a cam follower is carried at the free end of the other arm. This cam follower engages a cam that is non-rotatably mounted on the attachment, and a spring is associated with each bell crank to urge the cam follower against the cam.

As the wheels rotate the hub is imparted a corresponding movement and the cam follower caused to travel over the cam whereby the blades are moved in one direction. After the follower drops off the high point of the cam the springs cause the blades to move in an opposite direction.

It is evident that when a cam follower rides off the peak of the cam a particular bell crank is subjected to an appreciable shock or jar. Another object of the invention is the provision of a bumper for absorbing this shock.

Another object of the invention is the provision, in apparatus of the type indicated, of a cam for actuating the cutter carrying bell cranks, and which cam is tilted to an appropriate angle for accommodating the axial increment of movement which attends the outward radial thrust caused by the cam.

2

Still another object of the invention is the provision, in a cutting attachment of the type indicated, of a plurality of bell cranks which are pivotally mounted on a hub in such a manner as to provide for a step arrangement of the blades on the bell cranks. With such an arrangement the blades are operated in sequential order, giving an almost continuous chopping or cutting action.

Various other more detailed objects and advantages of the invention such as arise in connection with carrying out the above noted ideas in a practical embodiment will in part become apparent and in part be hereinafter stated as the description of the invention proceeds.

The invention therefore comprises a chopping attachment adapted for mounting on a tractor and which consists essentially of a pair of spaced wheels, between which are mounted a plurality of blade carrying bell cranks that are spring biased in one direction and forced into an opposite direction by a cam.

For a full and more complete understanding of the invention reference may be had to the following description and accompanying drawings wherein:

Figure 1 is a side view, partly in elevation, but mostly diagrammatic, depicting a tractor with a cutting attachment applied thereto in accordance with the precepts of this invention;

Figure 2 is an end elevation of the chopping attachment shown in Figure 1;

Figure 3 is a perspective taken on an enlarged scale showing the hub, one of the blade carrying bell cranks, the actuating cam, and the wheel at that end of the axle;

Figure 4 is a sectional view through the axle taken on an enlarged scale and with parts broken away to permit of illustration on this scale. This view is taken about on a plane represented by the line 4—4 of Figure 2;

Figure 5 is a view taken on a plane normal to the axis of the axle and developing the hub and cam in elevation and on an enlarged scale;

Figure 6 is another enlarged detailed showing bringing out one of the springs which is associated with each of the bell cranks;

Figure 7 is an enlarged detailed view of the cam and bumper shown in elevation;

Figure 8 is a view of the bumper per se and with parts broken away and shown in section;

Figure 9 is a cross section illustrating the latch mechanism for holding the cam against rotation in one direction; and Figure 10 is a plan view of the latch mechanism.

Referring now to the drawings, wherein like reference characters denote corresponding parts, and first more particularly to Figure 1, a tractor is therein illustrated in broken lines and referred to in its entirety by the reference character T. This tractor T includes a hitch bar designated 10.

A cutting or chopping attachment, which is referred to in its entirely by the reference character C, is mounted in back of the tractor T by a supporting structure designated generally S and which connects with the hitch bar 10.

The supporting structure S comprises a pair of side bars 11 which are arranged in spaced relation, with one end of each bar 11 pivotally secured to the hitch bar 10 by the connection represented at 12.

Extending between the rear ends of the side bars 11 is an axle shaft 13 that is secured to these side bars 11 so as to be held against rotation. This connection is indicated at 14 in Figure 4.

The ends of the axle shaft 13 may be threaded as represented at 15 and nuts 16 screwed thereon in abutting relation with the side bars 11 to maintain the assembled relation.

Upstanding from the side bars 11 are vertical uprights 17 and diagonal braces 18 which are connected by cable 19 with a hydraulic cylinder 20 which is mounted in a position conveniently accessible to a driver seated on the tractor T. Thus, the controls 20a of the cylinder 20 may be availed of if occasion demands to either raise or lower the cutting attachment C.

Obviously, when this attachment is lowered the supporting wheels, which are now to be described, will come into engagement with the ground surface and act as ground wheels, so that forward movement of the tractor T will impart rotation to these wheels.

Referring for the moment more particularly to Figures 2 and 4, the cutting attachment is shown as including a pair of spaced wheels 21 and 22. Wheel 21 is rotatably mounted on one end of the axle shaft 13 and includes a hub such as represented at 23 that is journaled on the axle shaft 13. Ordinarily a bearing shown at 24 is interposed between the hub 23 and the shaft 13. Wheel 21, as will be seen hereinafter, also supports wheel 22, the latter comprising only a rim part.

Outstanding from the hub 23 are a plurality of spokes 25, the inner ends of which are secured to the hub 23 in any preferred manner, such as by the welding shown at 26. The outer ends of the spokes 25 are anchored to the rim of wheel 21. Each of the rims may be provided with projections shown at 27, if desired, for insuring that engagement with the ground will cause rotation of the wheels.

Extending between the rims of the wheels 21 and 22 are a plurality of struts or braces 28. Each of these braces 28 has an end portion 29 that is offset from the main body of the braces and which end portion is anchored to each rim as by welding. It is evident that the braces 28 support the rim of wheel 22 and also cause the wheels 21 and 22 to rotate in unison.

A sleeve 30, which is an extension of the hub of wheel 21, is journaled on the axle shaft 13 and bearing members, such as represented at 31, will ordinarily be interposed between the sleeve 30 and the shaft 13. This sleeve 30 is designed for rotation about the shaft 13 in unison with the wheels 21 and 22.

A hub plate 32 is drivably mounted on the sleeve 30 and anchored thereto in any preferred manner such as by the welded joint represented at 33.

Referring now more particularly to Figure 5 it will be noted that the hub plate 32 carries a plurality of pivot mountings 34. Each of these pivot mountings 34 comprises a pair of ears 35 and 36 which are spaced apart and outstanding from an anchoring plate 37. The anchoring plate 37 is secured to one face of the hub plate 32 by the screw bolts shown at 38.

Extending between each pair of the ears 35 and 36 is a pivot pin 39 on which is pivotally mounted a bell crank that is referred to in its entirety by the reference character B. There is a bell crank B for each of the pivot mountings 34.

Obviously, the particular number of bell cranks included in each cutting attachment may be varied. In the form of the invention illustrated in the drawings provision is made for pivotally mounting eight of the bell cranks B. Obviously this number could be changed without departing from the spirit of the invention.

Each of the bell cranks B includes a radial arm 40, the outer free end of which carries a cutting blade 41 and an axially extending arm 42 which is substantially normal to the arm 40. A diagonal brace represented at 43 may extend between the arms 40 and 42.

It has been found desirable to form the arms 40 and 42 and the brace 43 from one integral piece.

Mounted on the free end of each arm 42 is a cam follower 44 which engages a cam 45 to be later described in detail.

At the joinder of the arms 40 and 42 the bell crank B carries a projection 46 that is offset with respect to the axis of the pivot pins 39. Another projection 47 outstands from the sleeve 30 and an expansion coil spring 48 has its opposite ends fitted over the projections 46 and 47, respectively.

It will be understood that there is an expansion coil spring 48 for each of the bell cranks B and this spring exerts a tendency to rotate the bell crank B in a clockwise direction, speaking with reference to the showing of Figure 3. This urges the cam follower 44 into engagement with the cam 45.

It is evident that as the tractor T moves in a forwardly direction and with the attachment C lowered so that the wheels 21 and 22 engage the ground the latter rotate. As they rotate the braces 28 will move with them and cause a corresponding movement on the part of the bell cranks B because the sleeve 30 is journaled on the axle shaft 13. As the bell cranks B rotate the cam followers 44 travel over the cam 45. The latter is of the formation illustrated in Figures 3 and 5 and includes a high point or peak at 49, off which each cam follower will fall when that point is reached.

Due to the configuration of the cam 45, as the cam follower 44 of each bell crank moves thereover, it will be moved radially outwardly. However, this radial movement will generate an axial increment so that it is necessary that the cam 45 be tilted at an angle to accommodate this axial increment.

As shown in the drawings the cam 45 is mounted on the hub sleeve 51 which is journaled on the axle shaft 13. The cam 45 is held against rotation in one direction by the latch mechanism 70.

The latch mechanism consists of a latch element 71 that is pivotally mounted between the angle brackets 72 and 73 on a pivot pin 74 that is held in place by a cotter pin 75. The latch 71 is carried on the frame member 11, as shown in Figure 3.

A second latch element 76 is carried on the spoke 77 of the cam 45 by means of a screw 78. The latch element 76 has a slot in it to permit adjustment of the latch element 76 relative to the spoke 77 and thus allow rotative adjustment of the position of the cam 45 relative to the frame 11.

An adjusting set screw 79 is carried in the end of the latch element 76 to provide for the adjustment of the element 76 relative to the spoke 77. A lock nut 81 is provided to retain the adjusting screw in its set position.

The opposite end of the latch element 76 has a projection 82 that engages the latch element 71 to prevent rotation of the cam 45 in a counter-clockwise direction, as viewed in Figure 3.

Since the wheels of the cotton chopper rotate in a counter-clockwise direction, as viewed in Figure 3, it will be apparent that the latch elements 71 and 76 will provide for a stationary positioning of the cam 45 relative to the frame 11, this being the normal operation of the device as it is moved over the ground.

However, should it be necessary to back the tractor, thus causing rotation of the wheels in a clockwise direction, as viewed in Figure 3, it will be apparent that the arms 43 will then strike the high point 49 of the cam 45, causing it to rotate in a clockwise direction, the latch elements 76 and 71 permitting this rotation to prevent damage to the equipment.

As soon as the tractor is again moved forward the wheels will rotate counterclockwise, and the cam follower 44 will strike the low point of the cam 45, causing it to rotate in a counter-clockwise direction until the latch element 76 again rests against the latch member 71.

It is evident that as each cam follower 44 rides off the peak 49, the spring 48 will be effective to rotate it in a clockwise direction with a very quick action, and to take up these shocks and jars and reduce their effect to a minimum a bumper assembly, such as shown in Figure 8, is provided. This assembly comprises a sleeve 53 which is journaled on the shaft 13 with a bearing 54 being interposed between the two.

Anchored to this sleeve 53 as by the welded joint represented at 55 is a hub sleeve 56. The latter has a peripheral portion 57 which is designed to cooperate with a complemental portion 58 formed on a second hub element 59 in gripping a rubber cushion 60. The rubber cushion 60 is in the form of a ring and the clamping or gripping engagement is generated by tightening up the screw bolts shown at 61. It is evident that as the cam follower 44 of each bell crank rides off the peak 49 the arm 42 will engage the rubber bumper 60. The ring may be angularly shifted about its support to make the wear thereof uniform if desired.

Referring now for the moment more particularly to Figure 5, it will be noted that each cam follower 44 may be mounted on a bearing 62 to reduce friction to a minimum.

As will be seen in Figures 2 and 3, there is a board 63 suspended outside of the spokeless wheel rim 22. This board serves to cause the chopped out debris to lie in a furrow so as to be readily picked up.

Operation

While the operation of the above described apparatus is believed to be ascertainable from the description already given, it may be briefly outlined by noting that when the cutting attachment C is to be rendered operative the operator avails of the controls 20a of the power cylinder 20 to lower the attachment so that the wheels 21 and 22 engage the ground surface. Forward movement of the tractor causes rotation of these wheels and of the hub 32 together with the bell cranks B carried thereby.

As the cam followers 44 ride off the cam 45 each of the bell cranks B is pivoted in a counter-clockwise direction. However, at the moment each cam of the cam followers 44 rides off the peak 49, the respective spring 48 is rendered effective to rotate the bell crank B in a clockwise direction and at high speed, thus imparting a cutting or chopping action to the blade 41. As the cutting stroke is terminated the arm 42 of the bell crank engages the bumper ring 60.

Due to the stepped arrangement of the blades 41 caused by the inclination of the cam 45 the cutting blades are operated in succession with an almost continuous cutting action.

While preferred specific embodiments of the invention are hereinbefore set forth, it is to be clearly understood that the invention is not to be limited to the exact constructions, devices and mechanisms illustrated and described, because various modifications of these details may be provided in putting the invention into practice within the purview of the appended claims.

What is claimed is:

1. In a cutting attachment of the character described, the combination of a frame including an axle shaft stationarily mounted therein, a hub element mounted for free rotation about said shaft, a cam journaled on said shaft, means on the frame engaging the cam and holding it against rotation in one direction, a plurality of bell cranks pivotally mounted on said hub element on axes normal to said shaft, a spring urging each of said bell cranks in one direction of rotation, a cam follower on the free end of one arm of each of said bell cranks and engaging said cam to rotate each of said bell cranks in opposition to said spring upon rotation of said hub element in one direction, and a cutting blade at the free end of the other arm of each of said bell cranks.

2. In a cutting attachment of the character described, the combination of a frame having a stationary axle shaft, a hub element mounted for free rotation about said shaft, a cam carried on said shaft, means on the frame engaging the cam and holding it against rotation in one direction, a bell crank pivotally mounted on said hub element on an axis normal to said shaft, a spring urging said bell crank in one direction of rotation, a cam follower on the free end of one arm of said bell crank and engaging said cam to rotate said bell crank in opposition to said spring upon rotation of said hub element in one direction, a cutting blade at the free end of the other arm of said bell crank, and a yieldable stop adapted to be engaged by said bell crank when it is rotated under the influence of said spring.

3. In a cutting attachment of the character described, a mounting for bell cranks comprising a hub element adapted to be freely journaled about an axle shaft, a plurality of pivotal mountings angularly spaced apart about said hub element and each of which presents a pair of spaced ears, a bell crank pivotally mounted between each of said pairs of ears, a plurality of projections angularly spaced apart about said axle shaft and corresponding in number and arrangement to said pivotal mountings, and a corresponding number of expansion coil springs, each of said springs having one end receiving one of said projections and the other engaging a bell crank.

4. In a cutting attachment of the character described, an axle shaft, a sleeve journaled on said shaft, a hub element carried by said sleeve, a plurality of projections angularly spaced apart about said sleeve and outstanding therefrom over a zone spaced from said hub element, a plurality of pivotal mountings corresponding in number and arrangement to said projections and secured to said hub element, a bell crank carried by each of said pivotal mountings and having a projection extending toward said sleeve, and an expansion coil spring for each of said bell cranks, each of said springs having opposite ends received in the projection of said bell crank and the projection on said sleeve, respectively.

5. In a cutting attachment of the character described, a frame comprising a stationary axle shaft, a pair of wheels adjacent respective opposite ends of said shaft, braces connecting the peripheral portion of said wheels and extending in directions substantially parallel to said axle shaft, a hub element freely journaled on said axle shaft and connected at one end to one of said wheels to be driven thereby, a plurality of bell cranks pivotally mounted on said hub element on axes normal to said axle shaft and angularly spaced apart thereabout, a cam journaled on said axle shaft, a latch on said frame positioned to engage said cam for holding said cam against rotation in one direction, a cam follower on the free end of one arm of each bell crank engaging said cam, spring means associated with each bell crank tending to rotate said bell crank in opposition to said cam, and a cutting element at the free end of the other arm of each of said bell cranks.

6. In a cutting attachment of the character described, a frame comprising a stationary axle shaft, a pair of wheels adjacent respective opposite ends of said shaft, braces connecting the peripheral portion of said wheels and extending in directions substantially parallel to said axle shaft, a hub element freely journaled on said axle shaft and connected to rotate with said wheels, a plurality of bell cranks pivotally mounted on said hub element on axes normal to said axle shaft and angularly spaced apart thereabout, a cam journaled on said axle shaft, a latch on the frame positioned to engage said cam for holding said cam against rotation in one direction, a cam follower on the free end of one arm of each bell crank engaging said cam, spring means associated with each bell crank tending to rotate said bell crank in opposition to said cam, and a cutting element at the free end of the other arm of each of said bell cranks, the cam follower of each of said bell cranks being adapted to ride off said cam whereby said spring means is rendered effective to rotate said bell crank about its pivotal mounting and impart a cutting action to said cutting element, and an annular bumper mounted coaxially on said shaft and adapted to be engaged by each bell crank at the end of its cutting stroke.

7. In a cutting attachment of the character described, a frame, an axle shaft in the frame, a cam carried on said shaft, cutting devices supported by said shaft and including a cam follower engaging said cam for causing actuation of said cutting devices upon rotation thereof about said cam, and latch means carried on the frame and engaging said cam for holding the same against rotation in one direction but allowing rotation thereof in an opposite direction.

8. In a cutting attachment of the character described, a frame, an axle shaft in the frame, a cam supported by said shaft and rotatable relative thereto, a plurality of cutting devices supported by said shaft and rotatable relative thereto and including cam followers engaging said cam for actuation of said cutting devices upon rotation thereof relative to said cam, and abutment means on the frame and cam adapted for engagement in one direction of rotation of the cam on the shaft and thereby holding the cam against rotation in one direction but allowing rotation thereof in an opposite direction.

9. In a cutting attachment of the character described, a frame, an axle shaft in the frame, a cam supported by said shaft and rotatable relative thereto, a plurality of cutting devices supported by said shaft and rotatable relative thereto and including cam followers engaging said cam for actuation of said cutting devices upon rotation thereof relative to said cam, an abutment on said cam and a stationarily mounted latch device on the frame adapted for engaging said abutment for holding the cam against rotation in one direction but allowing rotation thereof in an opposite direction, said latch device and abutment including adjusting means for adjustably positioning the same relative to said cam whereby to adjust the stopped position of said cam as held stationary by said latch device and abutment means.

10. In a cotton chopper of the type described: a frame having ground wheels and cutting devices in the frame adapted to be operative during forward motion thereof, a cam in the frame for actuating said devices and comprising an abrupt fall and a gradual rise, and latch means between the frame and the cam preventing rotation of the cam in one direction while permitting free rotation thereof in the opposite direction.

11. In a cotton chopper of the type described: a frame having ground wheels and cutting devices in the frame adapted to be operative during forward motion thereof, a cam in the frame for actuating said devices and comprising an abrupt fall and a gradual rise, and latch means between the frame and the cam preventing rotation of the cam in one direction while permitting free rotation thereof in the opposite direction, said latch means being adjustable to provide for exact positioning of said cam in its stopped position.

12. In a cotton chopper: a frame, an axle shaft carried in the frame, a wheel rim adjacent each end of the shaft in the frame, brace members connecting the wheel rims and extending parallel to said axle shaft, a hub journaled on one end of the axle shaft and connected to the adjacent of said wheel rims to be driven thereby, a plurality of bell cranks pivotally mounted on said hub on axes normal to said axle shaft and circumferentially spaced thereabout, a cam also journaled on said axle shaft, a latch carried by said frame positioned to engage said cam to prevent rotation thereof in one direction while permitting rotation thereof in the other direction, means on the free end of one arm of each bell crank engaging said cam, spring means for each bell crank for rotating the bell cranks in opposition to said cam and a cutting element at the free end of the other arm of each said bell crank, said cutting elements moving toward the one of said wheel rims at the opposite side of said frame from said hub whereby debris cut by said cutting elements is thrown through the said wheel rim.

13. In a cutting attachment of the character described, the combination of a frame having a stationary axle shaft, a hub element mounted for free rotation about said shaft, a cam on said shaft, a latch on the frame engaging the cam and holding it against rotation in one direction on the shaft, a plurality of bell cranks pivotally mounted on said hub element on axes normal to said shaft, a spring urging each of said bell cranks in one direction of rotation, a cam follower on the free end of one arm of each of said bell cranks and engaging said cam to rotate each of said bell cranks in opposition to said spring upon rotation of said hub element in one direction, a cutting blade at the free end of the other arm of each of said bell cranks, and an annular rubber bumper mounted on said axle shaft and adapted to be engaged by said bell cranks when they are moved under the influence of said springs.

ROBERT E. SELTZER.

REFERENCES CITED

The following references are of record in the file of this patent:

UNITED STATES PATENTS

| Number | Name | Date |
| --- | --- | --- |
| 697,028 | Shields | Apr. 8, 1902 |
| 871,055 | Head | Nov. 12, 1907 |
| 1,211,971 | Siemann | Jan. 9, 1917 |
| 1,452,046 | Henry | Apr. 17, 1923 |
| 1,491,557 | Killen | Apr. 22, 1924 |
| 2,504,004 | Dabbs et al. | Apr. 11, 1950 |
| 2,517,288 | Dabbs et al. | Aug. 1, 1950 |